United States Patent [19]
Wise

[11] Patent Number: 4,785,483
[45] Date of Patent: Nov. 22, 1988

[54] INTEGRATED PASSENGER SEAT AND TOILET APPARATUS AND METHOD

[76] Inventor: Paul H. Wise, 1825 S. Camino Seco, Tucson, Ariz. 85710

[21] Appl. No.: 142,957

[22] Filed: Jan. 12, 1988

[51] Int. Cl.⁴ .......................... E03D 1/00; B60N 1/10; B60R 15/64

[52] U.S. Cl. ......................................... 4/321; 4/114.1; 4/471; 4/478; 4/483; 4/252 R; 296/69; 296/65.1

[58] Field of Search ................ 4/114.1, 458, 459, 460, 4/462, 463, 471, 474, 478, 479, 480, 483, 252 R, 300, 420, 315, 321, 323; 296/63, 64, 65 R, 69; 297/240, 349

[56] References Cited

U.S. PATENT DOCUMENTS

| | | | |
|---|---|---|---|
| 356,654 | 1/1887 | Martin | 4/483 |
| 1,359,544 | 11/1920 | Stiles . | |
| 1,454,618 | 5/1923 | Banks . | |
| 1,569,571 | 1/1926 | Pew . | |
| 3,731,490 | 5/1973 | Sargent et al. | 60/317 |
| 4,261,613 | 4/1981 | Alford | 4/483 |
| 4,296,506 | 10/1981 | Stoute, Sr. et al. | 4/480 |
| 4,600,239 | 7/1986 | Gerstein et al. | 296/65 R |

FOREIGN PATENT DOCUMENTS 2741074  3/1979  Fed. Rep. of Germany .......... 4/480

Primary Examiner—Henry J. Recla
Assistant Examiner—Robert Fetsuga
Attorney, Agent, or Firm—Victor Flores

[57] ABSTRACT

Apparatus and method for integrated passenger seat and toilet for vehicles. The apparatus includes a structural seat, an integrated toilet, a water supply, a waste system and a swivel mechanism. The method includes modifying the vehicle, supplying the apparatus, installing the apparatus and using the apparatus. The passenger seat rotates to lockable positions for use in multiple orientations. Segmented seat cushion is hingeably attached to structural seat members and molded to provide a seal with the toilet seat below. Water is pumped from a reservoir through a flexible hose to a ported water rinse ring in the toilet. Wastes are released through a flapper mechanism into a holding tank sanitarily sealed to the toilet. Privacy curtain is provided.

18 Claims, 4 Drawing Sheets

INTEGRATED PASSENGER SEAT AND TOILET APPARATUS AND METHOD

FIELD OF THE INVENTION

The present invention generally relates to toilets for vehicles and, more particularly, to an apparatus and method for a toilet for vehicles wherein the toilet is an integral part of a functional passenger seat having multiple uses. The toilet of the present invention is basically comprised of a passenger vehicle seat, a toilet bowl, a modified seat cushion, a water supply, a waste system and a seat swivel mechanism. The toilet is functionally integrated with a vehicle passenger seat in a van, recreational vehicle or cross country truck and allows the seat to be used in multiple orientations for a variety of seating arrangements.

DESCRIPTION OF THE PRIOR ART

Vehicles are supplied with toilets to enable its passengers to travel long distances without leaving the vehicle, to avoid having to use public restrooms, to provide accessible private toilet facilities for handicapped travellers, and to provide toilet facilities in remote geographical areas. Vehicles have limited interior space and interior toilet apparatuses must be space efficient. Further, modern travel conditions require that any mobile toilet apparatus retain waste for disposal at an appropriate site.

Prior art reveals other toilet apparatuses for vehicles. U.S. Pat. No. 1,359,544 describes a toilet device for automobiles. A commode structure is located between the front and rear seats and is hinged so that, when not in use, the structure is lowered beneath the floor of the automobiles.

Another apparatus is described in U.S. Pat. No. 1,454,618. A combined commode and lavatory device consisting of depended basins is installed in a fixed automobile seat, with the various openings and cavities concealed by removable seat cushions.

U.S. Pat. No. 1,569,571 provides a toilet apparatus when an automobile seat is temporarily removed. The apparatus consists of an orifice in the floor of the vehicle covered by hinged doors. The doors swing up to support a toilet seat hinged to the side of the vehicle. The toilet systems taught by the prior art do not provide a passenger seat adapted with a toilet system which is self contained beneath an easily removable seat cushion and which is adapted to provide a sanitary toilet system having a water supply and a waste holding tank. Consequently, a need exists for a toilet apparatus for vehicles which is integrated with a passenger seat so as to require no space in the vehicle beyond that occupied by a regular seat, does not require removal of seats or seat sections, contains holding tanks while providing a seal against odor and splashing liquids, and provides for multiple positioned uses of the passenger seat within the vehicle.

SUMMARY OF THE INVENTION

The present invention provides an apparatus and a method for installation of a toilet in a vehicle so that the toilet is integrated with the structure of a rotatable vehicle seat, requires no additional space within the vehicle, and provides for sanitary collection of waste materials. The apparatus of the present invention consists of a modified passenger seat, a toilet which is structurally integrated with the seat, a water supply system, a waste system and a swivel mechanism. The method consists of providing a toilet structurally integrated with a passenger seat, modifying the vehicle to provide a water supply and a waste system, installing the toilet apparatus within the vehicle, and using the toilet apparatus.

Therefore, to the accomplishments of the foregoing objects, the invention consists of the foregoing features hereinafter fully described and particularly pointed out in the claims, the accompanying drawings and following disclosure describing in detail the invention, such drawings and disclosure illustrating, however, but one of the various ways in which the invention may be practiced.

DESCRIPTION OF THE PREFERRED EMBODIMENT

Figure 1:
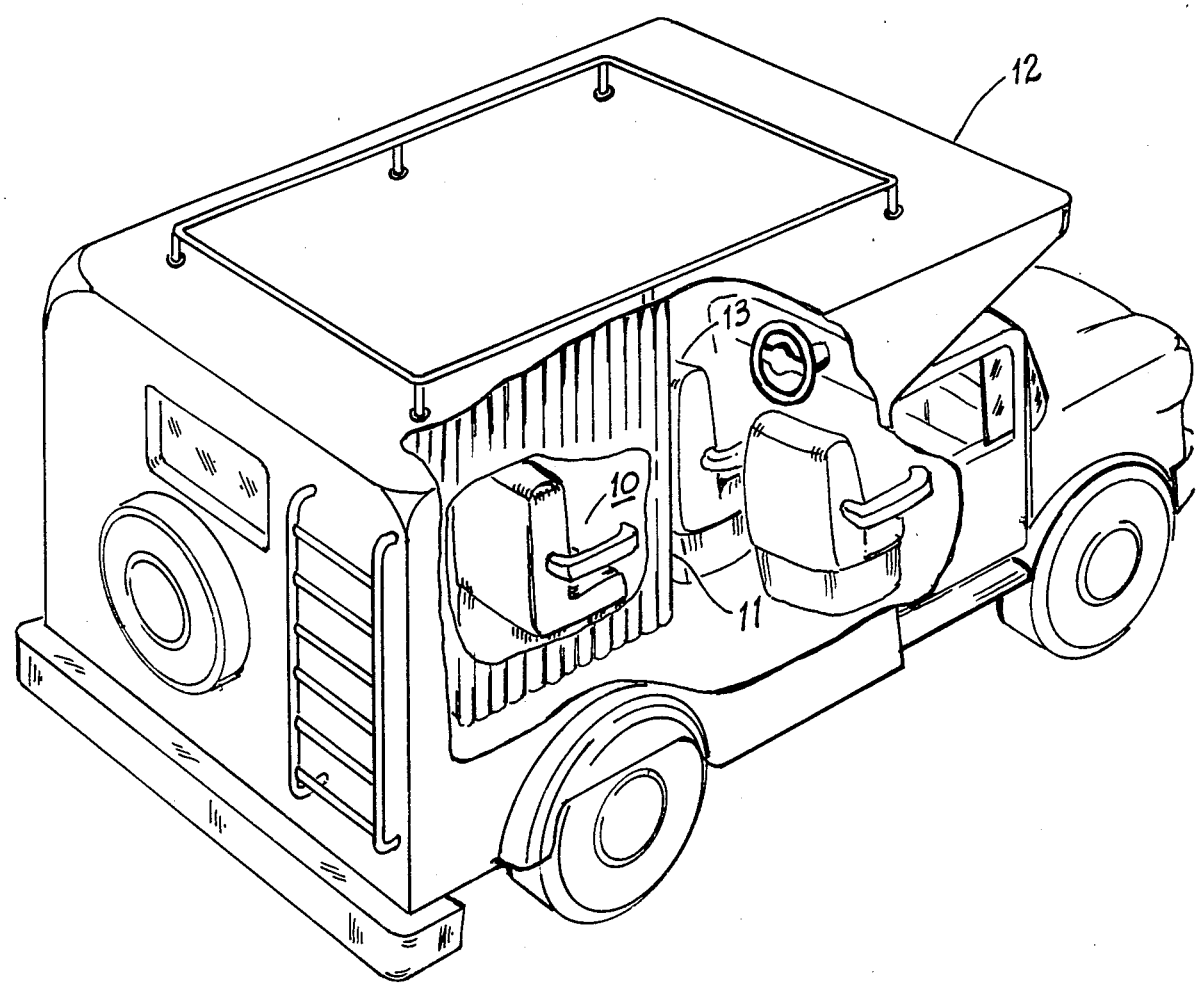
FIG. 1 is a perspective view of a vehicle showing the adapted passenger seat of the present invention enclosed by a privacy curtain and installed behind the vehicle driver's seat.

Referring now to the drawings, and more particularly to FIG. 1, there is shown a specially adapted vehicle passenger seat, generally designated 10, which comprises the preferred embodiment of the present invention. Passenger seat 10 is rotatably mounted behind driver's seat 13, within vehicle 12, wherein a privacy curtain 11 is provided.

Figure 2:
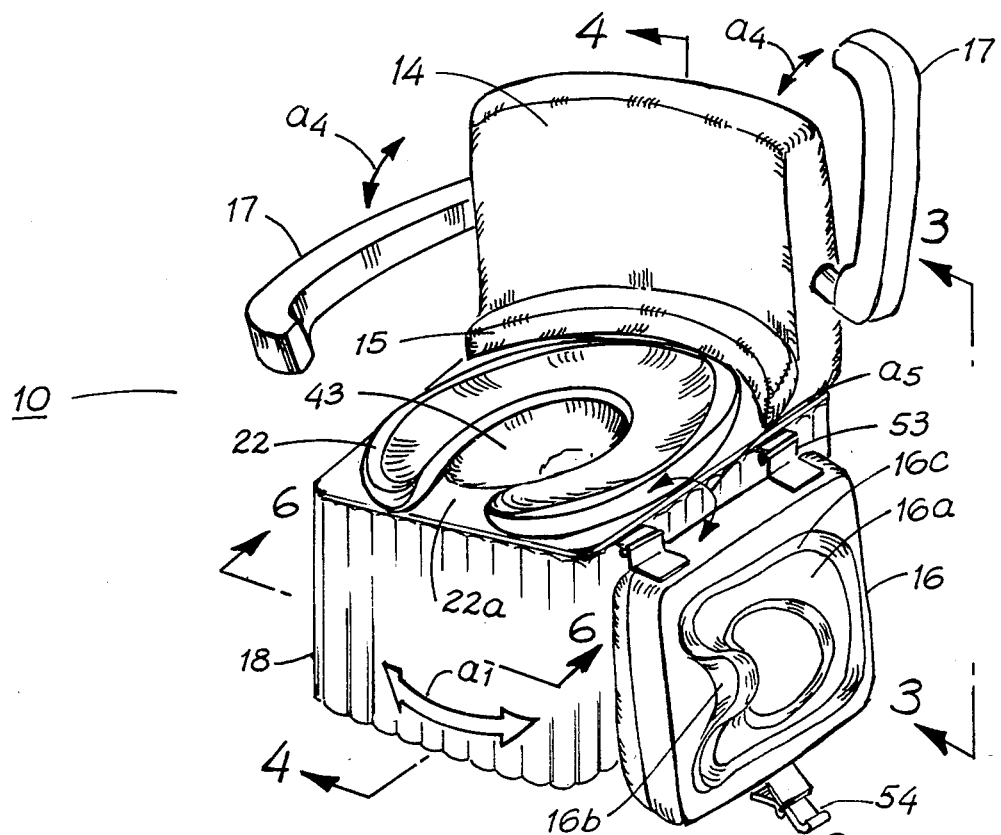
FIG. 2 is a perspective view of the adapted passenger seat of the present invention showing the hinged seat cushion in an open position and showing the stationary toilet seat and bowl of the present invention.
Figure 3:
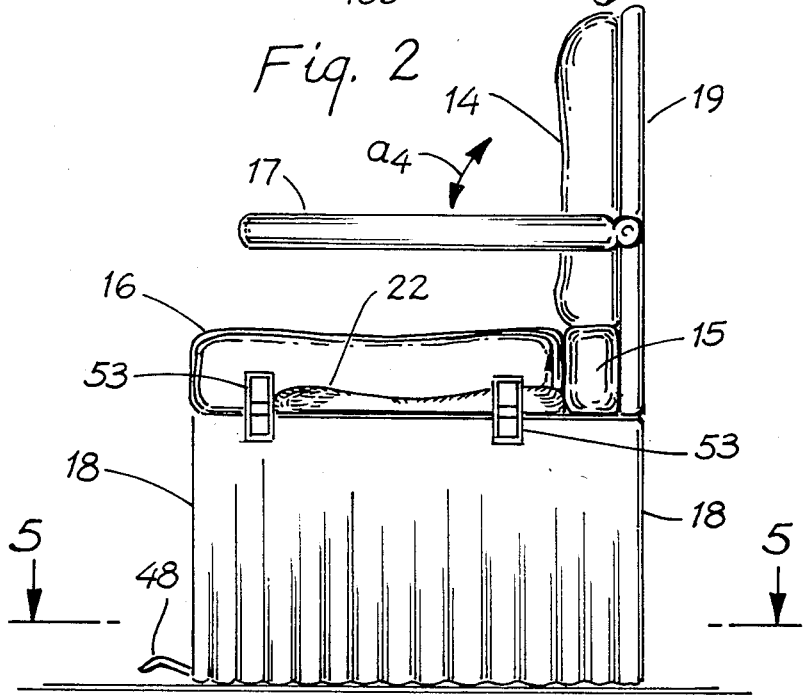
FIG. 3 shows a side elevational view of the present invention taken along line 3—3 of FIG. 2.
Figure 6:
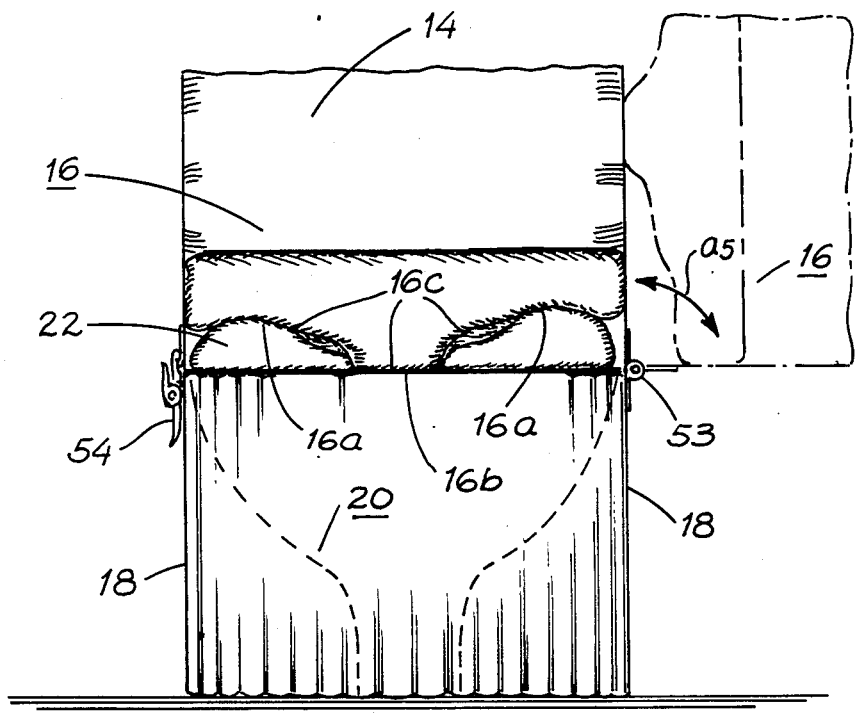
FIG. 6 is a fragmented frontal view of the toilet and passenger seat of the present invention taken along line 6—6 of FIG. 2 showing the hinged seat cushion in a latched, closed and sealed position and conforming to the stationary toilet seat on the toilet bowl.

Referring to FIGS. 2, 3, and 6, passenger seat 10 is seen to be provided with a seat back cushion 14, a fixed seat cushion section 15, a hinged seat cushion section 16, hinged arm rests 17 rotating in direction of arrows a4, and exterior pedestal covering 18. The underside 16a of hinged seat section 16 is contoured to conform to a stationary toilet seat 22 whereby protrusion 16b conforms to the open section 22a of toilet seat 22. Hinged seat cushion section 16 is hinged to passenger seat 10 by hinges 53 and may be securely latched when being used in a closed position with latch 54. Rotation about hinges 53 in direction of arrow a5 raises seat cushion section 16 and exposes toilet 20.

FIGS. 2, 3 and 6 show gasket 16c provided to maintain a sealed interface between the passenger seat and the toilet system beneath seat cushion 16. FIG. 2 further shows inner lining 43 of the toilet of the present invention and direction of swivel mechanism a1. FIG. 3 further shows flush lever 48.

Figure 4:
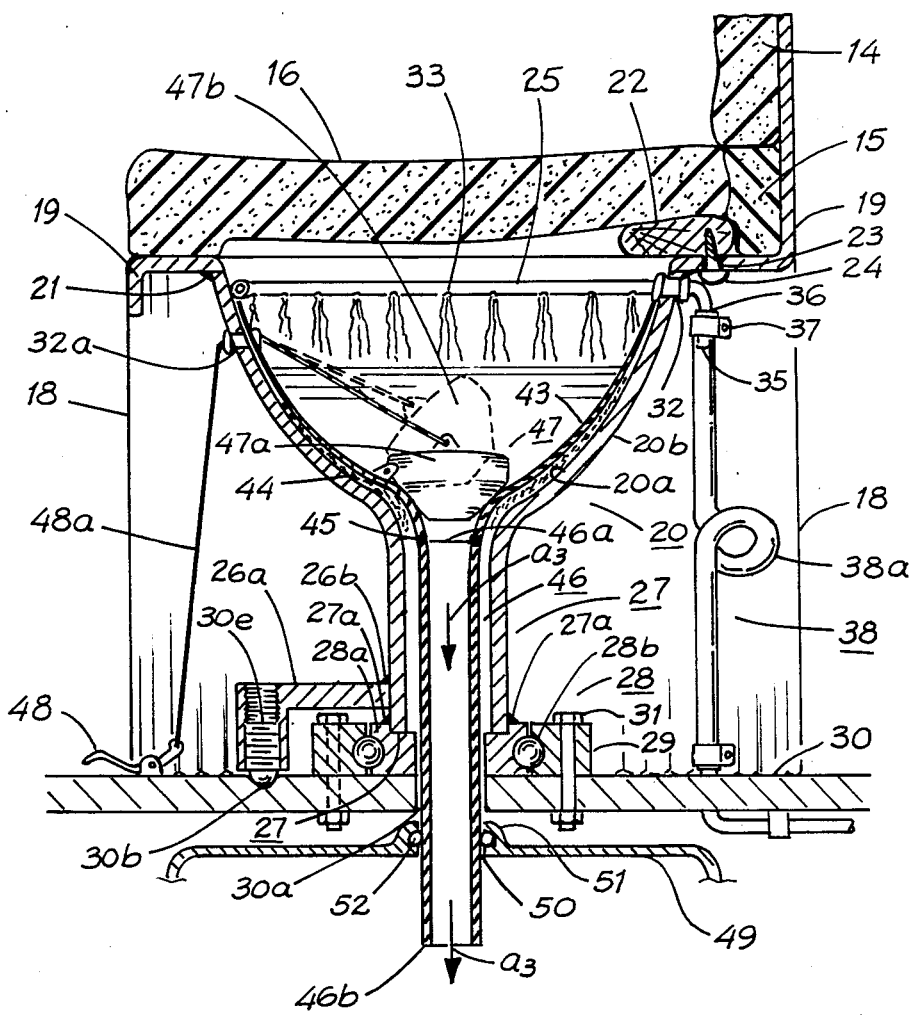
FIG. 4 is a fragmented sectional view taken along line 4—4 of FIG. 2 showing the seat structure, the seat cushions, the toilet bowl and associated vehicle floor mounting including the swivel mechanism of the present invention.

FIG. 4 shows toilet of the present invention, generally designated 20, exterior pedestal cover 18, seat structure 19, seat back cushion 14, fixed seat cushion 15, and hinged seat cushion 16 in a closed position. Toilet seat 22 is fixedly attached to chair structure 19 at mounting hole 23 with screw fastener 24. Upper end 25 of toilet bowl 20 is attached within chair structure 19 at weldments 21. Lower end 27 of toilet bowl 20 is fixedly attached to bearing swivel assembly generally designated 28 at weldments 27a.

FIG. 4 further shows toilet 20 having outer bowl surface 20b and inner bowl surface 20a. Inner bowl surface 20a has inner lining 43 attached as by using adhesive 44. Inner lining 43 is attached to upper end 46a of drain pipe 46 at joint 45. Lower end 46b of drain pipe 46 passes through vehicle floor 30 at hole 30a, through o-ring 52 and sanitary lip seal 51, and through entry 50 to holding tank 49.

FIG. 4 further shows flexible water supply hose 38 having slack loop 38a. End 36 of flexible water supply hose 38 is fastened to inlet port 35 of perforated water rinse ring 33 by clamp 37. Perforated water rinse ring 33 is mounted in toilet 20 at entry hole 32. Operation of flush lever 48 reversibly activates flush linkage 48a which passes into toilet 20 at entry hole 32a and reversibly raises flush float 47 from lowered and closed position 47a to raised and open position 47b, allowing waste to flow through drain pipe 46 in direction of arrows a3.

Figure 5:
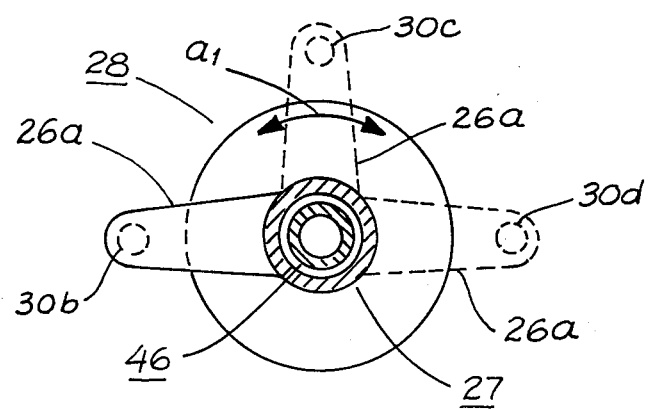
FIG. 5 is a fragmented plan view taken alone line 5—5 of FIG. 3 showing the stop positions of the passenger seat swivel mechanism.

Swivel mechanism 28 of the present invention is shown in FIGS. 4 and 5. Lower end 27 of toilet 20 is fixedly attached to inner bearing race 28a at weldments 27a. Outer bearing race 29 is fixedly mounted to vehicle floor 30 with bolt fasteners 31. Ball bearings 28b allow rotation of inner bearing 28a and attached toilet 20 in directions of arrow a1. Seat latch 26a is attached to toilet 20 at weldment 26b and comprises latch mechanism FIG. 4 shows latch mechanism 30e engaged at forward detente position 30b of vehicle floor 30. Rotation of the toilet in directions of arrow a1 is alternatively arrested at side position by side detente position 30c and at back position by back detente position 30d.

Figure 7:
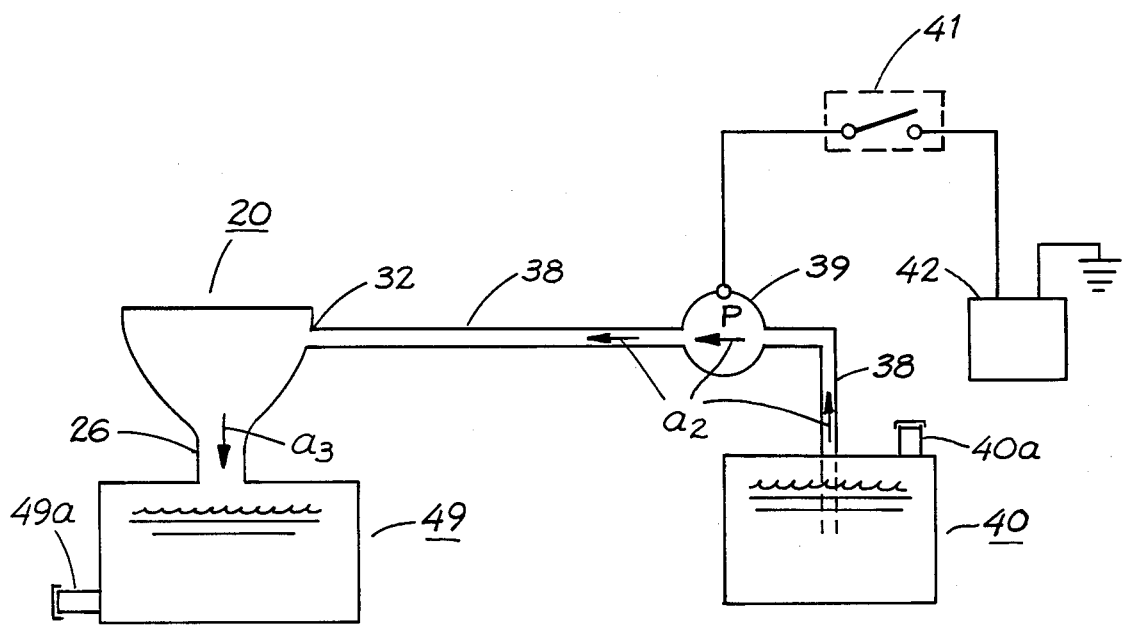
FIG. 7 is a functional diagram of the vehicle toilet system showing, the water supply, and the waste system of the present invention.

FIG. 7 schematically illustrates water supply and waste systems of the invention. Switch 41 controls current from electrical source 42 to pump 39. Pump 39 withdraws water from water supply reservoir 40 through flexible hole 38 in direction of arrows a2 to toilet bowl 20 at entrance 32. Waste fluids flow through lower toilet bowl 26 into holding tank 49 in direction of arrow a3. Water supply reservoir 40 has fill 40a and holding tank 49 has drain 49a.

Therefore, while the present invention has been shown and described herein in what is believed to be the most practical and preferred embodiment, it is recognized that departures can be made therefrom within the scope of the invention, which is therefore not to be limited to the details disclosed herein but it is to be accorded the full scope of the claims so as to embrace any and all equivalent apparatus.

I claim:

1. An integrated passenger seat and toilet system for vehicles, comprising:
   (a) a passenger seat;
   (b) a toilet structurally integrated with said passenger seat;
   (c) a toilet seat attached to said toilet;
   (d) swivel mounting means for rotatably mounting said toilet to the vehicle floor;
   (e) a water supply system connected to said toilet and adapted to be installed within said vehicle; and
   (f) a waste system connected to said toilet and adapted to be installed within said vehicle.

2. An integrated passenger seat and toilet for vehicles as recited in claim 1, wherein said passenger seat includes:
   (a) a steel seat structure;
   (b) a chair back structure fixedly attached to said steel seat structure;
   (c) a back cushion attached to said chair back structure;
   (d) a segmented seat cushion attached to said steel seat structure; and
   (e) an exterior cover attached to said steel chair structure for covering said toilet.

3. An integrated passenger seat and toilet for vehicles as recited in claim 2, wherein said segmented seat cushion further includes:
   (a) a rear cushion section fixedly attached to said steel seat structure; and
   (b) a removable cushion section hingeably attached and latchable to said steel seat structure.

4. An integrated passenger seat and toilet system for vehicles as recited in claim 3, wherein said removable cushion section further includes:
   (a) a lower surface molded to conform to the contours of said toilet seat; and
   (b) a gasket to seal the interface between said lower surface of said removable seat cushion and said toilet seat.

5. An integrated passenger seat and toilet system for vehicles as recited in claim 1, wherein said toilet includes:
   (a) a steel bowl having a steel bit tube;
   (b) a toilet bowl liner adhesively applied within said steel bowl;
   (c) a perforated water supply ring mounted within said steel bowl;
   (d) an inlet tube integrally formed within said steel bowl;
   (e) a plastic drain pipe within said steel exit tube and attached to said toilet bowl liner; and
   (f) a flush mechanism attached to said toilet.

6. An integrated passenger seat and toilet system for vehicles as recited in claim 5, wherein said flush mechanism further includes:
   (a) a flush lever;
   (b) a flush linkage attached to said flush lever and entering said toilet bowl; and
   (c) a flush float attached to said flush linkage mounted within said toilet bowl and over said plastic drain pipe.

7. An integrated passenger seat and toilet system for vehicles as recited in claim 1, wherein said swivel mounting includes:
   (a) a bearing mechanism; and
   (b) a stop mechanism.

8. An integrated passenger seat and toilet system for vehicles as recited in claim 7, wherein said bearing mechanism further includes:
   (a) an inner race fixedly attached to said toilet;
   (b) an outer race fixedly attached to said vehicle; and
   (c) ball bearing tracks between said inner race and said outer race.

9. An integrated passenger seat and toilet system for vehicles as recited in claim 7, wherein said stop mechanism further includes:
(a) a seat latch attached to said toilet; and
(b) detente positions attached to said vehicle.

10. An integrated passenger seat and toilet system for vehicles as recited in claim 1, wherein said water supply system includes:
(a) a water supply reservoir;
(b) a water supply hose connecting said water supply reservoir to said toilet;
(c) a pump moving water unidirectionally through said water supply hose from said water supply reservoir to said toilet;
(d) an electrical power supply;
(e) an electrical switch controlling the supply of power from said electrical power supply to said pump.

11. An integrated passenger seat and toilet system for vehicles as recited in claim 1, wherein said waste system includes:
(a) a holding tank; and
(b) a seal connecting said toilet to said holding tank including an O-ring and an outer lip seal.

12. An integrated passenger seat and toilet system for vehicles, comprising:
(a) a passenger seat including
   (i) a steel seat structure,
   (ii) a chair back structure fixedly attached to said steel seat structure,
   (iii) a back cushion fixedly attached to said chair back structure,
   (iv) a fixed rear seat cushion section fixedly attached to said steel seat structure, and
   (v) a removable cushion section hingeably attached to said steel seat structure;
(b) a toilet structurally integrated with said passenger seat including
   (i) a steel bowl for receiving waste,
   (ii) a liner within said steel bowl,
   (iii) a perforated water supply ring mounted within said steel bowl,
   (iv) an inlet tube integrally formed with said steel bowl,
   (v) a toilet seat fixedly attached to said steel seat structure,
   (vi) a drain pipe integrally attached within said steel bowl,
   (vii) a flush flap mounted in said drain pipe;
(c) a swivel mounting attached to said passenger seat including
   (i) an inner bearing race fixedly attached to said toilet,
   (ii) an outer bearing race adapted to be fixedly attached to said vehicle,
   (iii) ball bearing tracks between said inner bearing race and said outer bearing race,
   (iv) a seat latch attached to said toilet, and
   (v) detente positions for receiving said seat latch and adapted to be attached to said vehicle;
(d) a water supply system connected to said toilet and adapted to be installed within said vehicle, including
   (i) a water supply reservoir,
   (ii) a water supply hose connecting said water supply reservoir to said toilet,
   (iii) a pump moving water unidirectionally through said water supply hose from said water supply reservoir to said toilet,
   (iv) an electrical power supply,
   (v) an electrical switch controlling the supply of power from said electrical power supply to said pump; and
(e) a waste system connected to said toilet and adapted to be installed within said vehicle, including
   (i) a holding tank,
   (ii) a double seal connecting said drain pipe of said toilet to said holding tank, and
   (iii) a release mechanism operatively connected to said flush flap to release waste from said steel bowl to said holding tank.

13. An integrated passenger seat and toilet system for vehicles as recited in claim 12, wherein said release mechanism further includes:
(a) a flush lever; and
(b) a flush linkage attached between said flush lever and said flash flap and entering said toilet bowl.

14. An integrated passenger seat and toilet system for vehicles as recited in claim 12, further comprising:
(a) an exterior cover attached to said steel seat structure for covering said toilet; and
(b) a privacy curtain adapted to be installed within said vehicle and surrounding said passenger seat.

15. A method for equipping a vehicle with an integrated passenger seat and toilet, comprising:
(a) providing a passenger seat having a chair back and a chair seat;
(b) providing a toilet structurally integrated with said chair seat;
(c) providing a toilet seat attached to said toilet;
(d) modifying said vehicle to accept installation of said provided integrated passenger seat and toilet;
(e) installing said integrated passenger seat and toilet in said vehicle passenger seat and toilet in said vehicle;
(f) providing a swivel mounting attached between said toilet and the floor of said vehicle;
(g) installing a water supply system within said vehicle and connecting said water supply system to said toilet; and
(h) installing a waste system within said vehicle and connecting said waste system to said toilet.

16. A method for equipping a vehicle with an integrated passenger seat and toilet as recited in claim 15, wherein said step of providing said integrated passenger seat and toilet includes:
(a) providing a passenger seat including
   (i) a steel seat structure,
   (ii) said chair back structure fixedly attached to said steel seat structure,
   (iii) a back cushion fixedly attached to said chair back structure,
   (iv) a fixed rear seat cushion section fixedly attached to said steel seat structure, and
   (iv) a removable cushion section hingedly attached and latched to said steel seat structure;
(b) providing said toilet structurally integrated with said passenger seat including
   (i) a steel bowl,
   (ii) a liner within said bowl,
   (iii) a perforated water supply ring mounted within said steel bowl, (iv) an inlet tube integrally formed with said steel bowl connecting to said wateer supply ring (v) said toilet seat fixedly attached to said steel seat structure, and (vi) a drain pipe integrally attached within said steel bowl;

(c) providing said swivel mounting attached to said passenger seat including (i) an inner bearing race fixedly attached to said toilet, (ii) an outer bearing race for fixedly attaching to said vehicle, (iii) ball bearing tracks for mounting between said inner bearing race and said outer bearing race, (iv) a seat latch attached to said toilet, and (v) detente positions stops for attaching to said vehicle;

(d) providing said water supply system for installing within said vehicle, including (i) a water supply reservoir, (ii) a water supply hose for connecting said water supply reservoir to said toilet, (iii) a pump for moving water unidirectionally through said water supply hose from said water supply reservoir to said toilet, (iv) an electrical power supply, (v) an electrical switch for controlling the supply of power from said electrical power supply to said pump; and (e) providing said waste system for installing within said vehicle, including (i) a holding tank, (ii) a double seal for connecting said toilet to said holding tank, (iii) a flush float attached within said toilet, and (iv) a release mechanism for activating said flush float.

17. A method for equipping a vehicle with an integrated passenger seat and toilet as recited in claim 16, wherein said step of modifying said vehicle includes (a) mounting said water supply reservoir on said vehicle;

(b) mounting said holding tank on said vehicle;

(c) cutting a hole through the floor of said vehicle above said holding tank;

(d) mounting said detente position stops on the floor of said vehicle; and (e) hanging a curtain from the ceiling of said vehicle.

18. A method for equipping a vehicle with an integrated passenger seat and toilet as recited in claim 17, wherein said step of installing said integrated passenger seat and toilet in said vehicle includes (a) pressing said drain pipe tube into said double seal;

(b) fixedly mounting said outeer bearing race to the floor of said vehicle;

(c) connecting said supply hose to said inlet tube;

(d) mounting said waste release lever in said vehicle; and (e) mounting said electrical switch in said vehicle.

* * * * *

UNITED STATES PATENT AND TRADEMARK OFFICE
CERTIFICATE OF CORRECTION

PATENT NO. : 4,785,483
DATED : NOVEMBER 22, 1988
INVENTOR(S) : PAUL H. WISE

It is certified that error appears in the above-identified patent and that said Letters Patent are hereby corrected as shown below:

In claim 5 line 4 after "steel" delete "bit" and insert therefor --exit--.

In claim 13 line 6 after "and said" delete "flash" and insert therefor --flush--.

In claims 16 line 22 after "to said" delete "wateer" and insert therefor --water--.

In claim 18 line 6 after "mounting said" delete "outeer" and insert therefor --outer--.

Signed and Sealed this

Fourteenth Day of March, 1989

Attest:

DONALD J. QUIGG

Attesting Officer

Commissioner of Patents and Trademarks